US008282471B1

(12) United States Patent
Korner

(10) Patent No.: US 8,282,471 B1

(45) Date of Patent: Oct. 9, 2012

(54) COMPUTER-IMPLEMENTED SPORTS WAGERING SYSTEM AND METHOD

(76) Inventor: Peter Eli Korner, Las Vegas, NV (US)

( * ) Notice: Subject to any disclaimer, the term of this patent is extended or adjusted under 35 U.S.C. 154(b) by 1 day.

(21) Appl. No.: 13/043,801

(22) Filed: Mar. 9, 2011

(51) Int. Cl.
*G06F 17/00* (2006.01)

(52) U.S. Cl. .......................................................... 463/25

(58) Field of Classification Search .............. 460/20–25, 460/40–43; 463/20–26, 40–43, 28, 6
See application file for complete search history.

(56) References Cited

U.S. PATENT DOCUMENTS

| | | | | |
|---|---|---|---|---|
| 7,302,412 | B1 * | 11/2007 | Speck | 705/37 |
| 7,962,400 | B2 * | 6/2011 | Amaitis et al. | 705/37 |
| 2004/0128157 | A1 * | 7/2004 | Aquilino et al. | 705/1 |
| 2007/0207849 | A1 * | 9/2007 | Asher et al. | 463/19 |
| 2011/0003634 | A1 * | 1/2011 | Manteris | 463/25 |
| 2011/0130189 | A1 * | 6/2011 | Asher et al. | 463/17 |
| 2012/0058815 | A1 * | 3/2012 | Ivanov | 463/25 |

* cited by examiner

*Primary Examiner* — Ronald Laneau

(74) *Attorney, Agent, or Firm* — Glenn E. Gold; H. John Rizvi; Gold & Rizvi, P.A.

(57) ABSTRACT

A network based sporting event wagering system includes a licensed wagering exchange company having a central office with a central computer, memory storage unit, and an instruction set executable by the central computer and at least one licensed bookmaker associated with said wagering exchange company. A first network terminal is accessible by the bookmaker, and a second network terminal is accessible by a bettor for posting a desired sporting event wager with odds preferred by the bettor. An electronic network connects the first network terminal and the second network terminal with the computer at the betting exchange company. The executed instruction set operates on the central computer to receive the desired wager from the bettor and displays the desired wager to the bookmaker such that the bookmaker has the option of accepting the desired sporting event wager at the odds preferred by the bettor.

20 Claims, 3 Drawing Sheets

COMPUTER-IMPLEMENTED SPORTS WAGERING SYSTEM AND METHOD

FIELD OF THE INVENTION

The present disclosure generally relates to computer aided sports wagering. More particularly, the present disclosure relates to a system and method for pairing a betting player with an authorized bookmaker to finalize a bet on a sporting event.

BACKGROUND OF THE INVENTION

The business of sports gambling is a multi-billion dollar industry, which is particularly popular in places like Las Vegas, Nev. where gambling is legal. With the size of the industry comes the need for information, such as the current odds regarding the event to be bet on. Bookmakers use odds to balance the amount of money bet on each team, so as to protect the individual or establishment taking the bet from losing money. Bettors use published odds when deciding whether to place a bet. For example, games where there is a powerful team taking on a weaker team would obviously generate more bets for the more powerful team. Odds are introduced to deter some of those who would place bets on the more powerful team. These odds can be in the form of a point spread (or line), which force the "favored" team to win by a certain amount of points, or the "underdog" to lose by less than those points, in order for someone betting on them to collect. These odds fluctuate as bets are taken, so the total amount of money bet on one team is the same or very close to the same as on the other team. Accordingly, multiple different sports books taking bets can offer different odds, depending on what bets they have already taken. For a prospective bettor, the current odds for each sports book are important because they may want to bet on a game at specific predefined odds. Therefore, odds information for the various Las Vegas and other international sports books are an integral part of the betting process.

Typically, in order to become aware of the lines/odds of a sports book, an individual bettor must contact each sports book and inquire as to the offered odds. While each sports book may have their preferred odds, a bettor may have a different evaluation of the competing teams and desire to place a bet based upon his evaluation of differing odds. By the time the bettor has contacted all of the sports books and decided on a particular one with which to place a bet, the line/odds may have changed. While systems exist allowing a bettor to utilize the Internet for checking odds/lines for each sports book in real time, many bettors find this too time consuming and will forego placing a bet if they cannot quickly find desired odds for a particular sporting event.

However, even after checking the Internet resources for odds published by the various legal bookmakers, the bettor may not find odds that he/she desires to place a bet on a particular sporting event. Consequently, current systems generally require the bettor to seek out a bookmaker and then initiate the placement of the bet with that bookmaker at the bookmaker's published odds even though the odds may not be those desired by the bettor.

Therefore, a system and method of placing wagers utilizing the Internet is needed whereby a prospective bettor can post an offer for a desired wager at specific odds which may or may not correspond to bookmaker's published odds. Further, the system and method would permit bookmakers to view the offered wagers and decide to accept all or part of the bettor's offered wager at the bettor's preferred odds.

SUMMARY OF THE INVENTION

The present disclosure is generally directed to a network based sporting event wagering system that includes a licensed wagering exchange company having a central office with a central computer, memory storage unit, and an instruction set stored on the memory storage unit and executable by the central computer and at least one licensed bookmaker associated with said licensed wagering exchange company. A first network terminal is accessible by the bookmaker, and a second network terminal is accessible by a prospective bettor for posting a desired sporting event wager with odds preferred by the prospective bettor. An electronic network connects the first network terminal and the second network terminal with the central computer at the betting exchange company. The executed instruction set operates on the central computer to receive the desired wager from the prospective bettor and displays the desired wager to the bookmaker such that the bookmaker has the option of accepting the desired sporting event wager at the odds preferred by the prospective bettor.

In another aspect, a method of matching a bookmaker with a bettor who is offering a wager on a sporting event at specified odds uses an executable instruction set hosted on a system of the type wherein the central office of a betting exchange company has a central computer and memory storage connected to an electronic network, a first network terminal accessible by a bookmaker, and a second network terminal accessible by a prospective bettor desiring to place a wager on a sporting event at preferred odds. The method includes receiving, from a prospective bettor, an offer to wager a specified amount of money on a sporting event at odds preferred by the prospective bettor, and deducting a monetary amount of the offered wager from a financial account of the prospective bettor. The wager offers received on the sporting event, including the bettor's preferred odds, are posted for display to bookmakers. A wager accepted by a bookmaker at the odds preferred by the prospective bettor is recorded by the betting exchange. A monetary amount of the accepted wager is deducted from a financial account of the bookmaker. After completion of the sporting event, a determination is made as to whether the bettor or the bookmaker is the winner of the wager, and then payment of the wager is effected to the winning party of the accepted wager.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left", "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
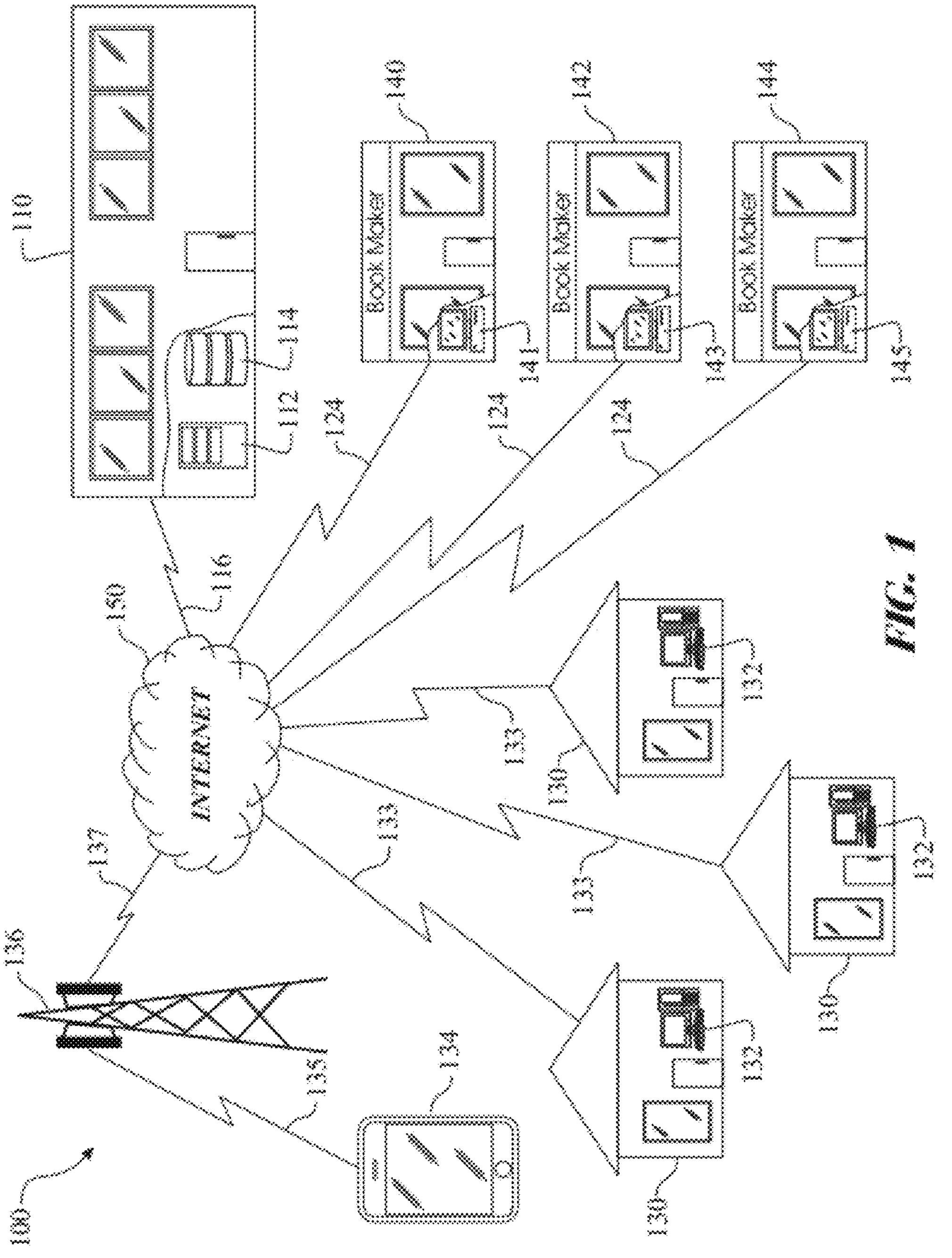
FIG. 1 presents a schematic depiction of a system for matching a bookmaker with a bettor who is offering a bet on a sporting event at specified odds.

Turning to the drawings, FIG. 1 shows a system 100 for matching a bookmaker (also known as a sports book) with a bettor, in accordance with one of the preferred embodiments of the present invention, and illustrates its various components. Bettor matching system 100 is based at a central office 110 of a betting exchange company. Betting exchange company central office 110 houses a computer 112 executing an instruction set for matching prospective bettors with bookmakers, typically bookmakers associated with a licensed casino, and is further interconnected with a searchable storage medium 114. Computer 112 is also connected to the Internet 150 with a communications link 116 for communicating with entities outside of central office 110.

One or more bookmakers 140, 142, 144 subscribe to the matching services offered by the betting exchange company. Each service provider 140, 142, 144 has a network terminal 141, 143 145 such as a personal computer that is further electronically linked to Internet 150 via electronic communication links 124. In this manner, bookmakers 140, 142, 144 can communicate with central office 110 of the betting exchange company utilizing the communication protocols of the Internet and the instruction set executed by computer 112 at central office 110.

In like manner, prospective bettors 130 (represented herein by home pictorials) also possess network terminals 132 such as a personal computer which are communicative with Internet 150 via electronic communication links 133. Alternatively, prospective bettors 130 can also communicate over Internet 150 utilizing a portable personal electronic device 134 communicative via link 135 of dedicated communications network 136. Communications network 136 is further communicative with Internet 150 via communications link 137. Those practiced in the art will readily recognize that personal electronic device 134 can be a smart phone, a personal digital assistant, a netbook, or other similar device currently available or available in the future that exhibits electronic communications abilities such as text messaging, email, or other communication protocols.

Figure 2A:
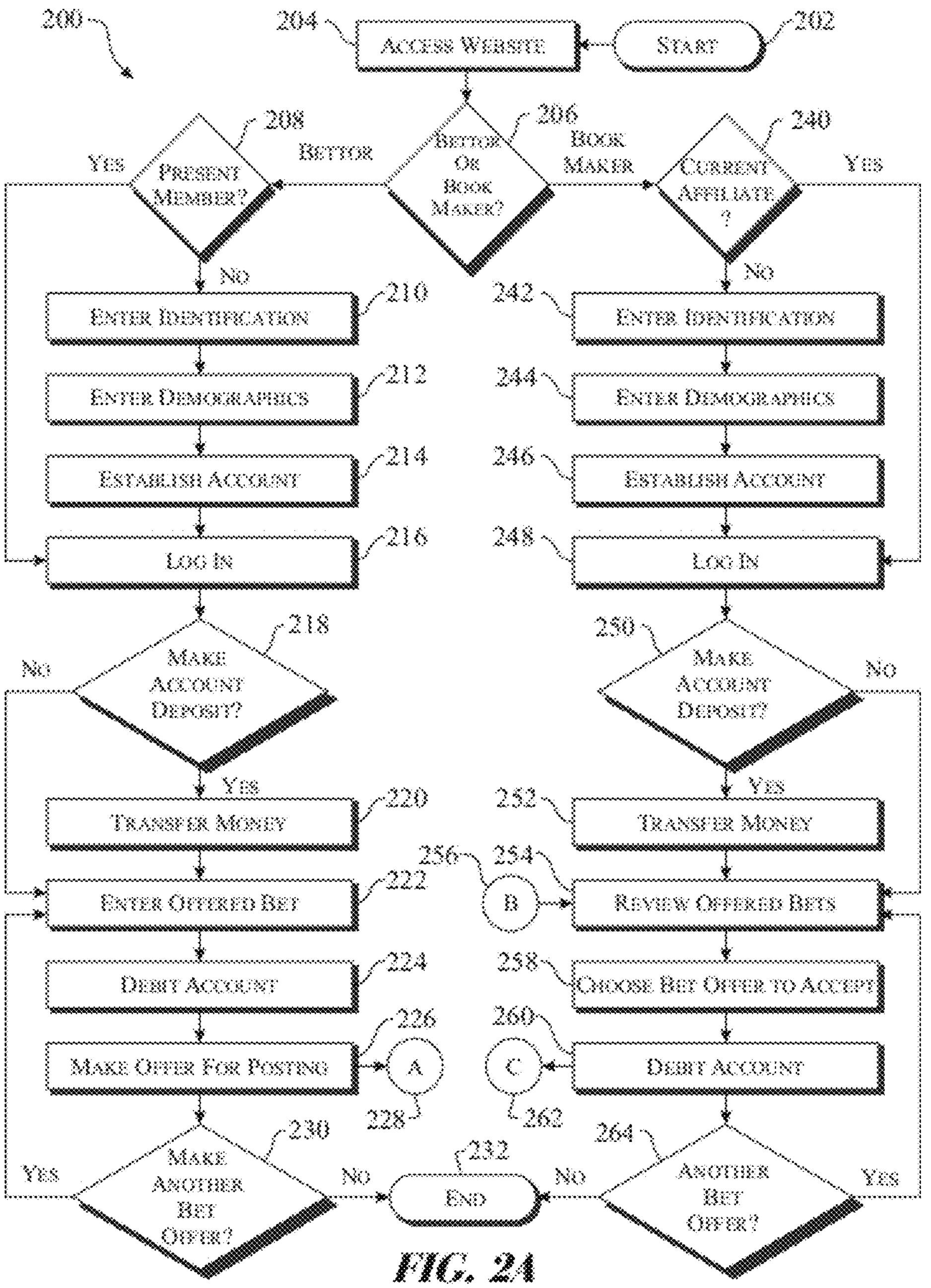
FIG. 2 presents a block diagram of a method of matching a bookmaker with a bettor who is offering a bet on a sporting event at specified odds.

Turning to FIG. 2A, a process 200 for matching a bookmaker with a prospective bettor utilizing matching system 100 is shown illustrating the matching of one of the bookmakers 140, 142, 144 with a prospective bettor 130 for establishing a wager on a sporting event. In step 202 the process starts wherein a user establishes access to the betting exchange home office 110 in block 204 and is queried in block 206 whether the user is a prospective bettor 130 or a bookmaker 140, 142, 144. If the user is a prospective bettor 130, the user is asked in block 208 whether they are a present member. If the user is a present member, they are directed to block 216 for login to the website.

If the user is not a present member, they are directed to block 210 to enter new membership identification such as a user name and password. In block 212 the new member enters demographic information such as address, contact information (i.e., email, telephone, or cell phone), age group, and optional information useful to the matching service. Such optional information may include where the new member learned of the service, and identification of a referring member for awarding credit to the referring member. Additional information may include submitting proof of residence in a territory (such as the State of Nevada) in which the governmental entity has legalized wagering or betting. The user is then prompted in block 214 to establish a financial account with the betting exchange for depositing money in the account for the purpose of using the deposited monetary funds for making wagers. The new member's preferred method of transferring monetary funds can also be established and entered as part of the account establishment process of block 214. After establishing the user's new membership, they are requested to login to their account in block 216 by entering their user name and password established in block 210.

Once logged in to their account, the user, in block 218, is queried whether they wish to make a deposit of monetary funds into their financial account. The betting exchange requires that as prerequisite of all placed wagers, the party offering a wager or accepting an offered wager have monetary funds on deposit with the betting exchange at least in the amount of the prospective wager. No credit or credit extensions are permitted. If the user does not wish to make a deposit the process proceeds to block 222. However if the user 130 wishes to make a deposit in their financial account, the process is directed to block 220 and the money is transferred from the user 130 to the betting exchange 110 for credit in the user's financial account. The process then proceeds to block 222 where the user 130 can enter into the system via their network terminal 132 or portable communication device 134 the offer to place a wager at odds desired by the user or prospective bettor. Preferably, all offered wagers are only permitted to be straight bets, not parlays and teasers. Straight bets may include action on a team's result, a total point result for a game, money line (action utilizing odds instead of a spread) and any other propositions that the betting exchange disseminates to its customers that bookmakers post at their specific locations.

Once the prospective bettor has entered their offered wager in block 222, their financial account is debited for the amount of the prospective wager, in block 224, to be held by betting exchange 110. Only a bettor can post an offered wager. The prospective bettor's offered wager is then marked for posting in block 226 whereupon, as indicated by bubble 'A' 228, the offered wager is processed further. A prospective bettor may retract their offered wager at any time as long as the offered wager has not been accepted. Once an offered wager has been accepted by a bookmaker 140, 142, 144, the transaction is finalized and cannot be retracted by either the bettor or the bookmaker. Once the user's wager offer is marked for posting in block 226, the user is queried whether they wish to place another wager offer. If they so desire, the process returns to block 222 and continues until the user desires to make no further wager offers and the process then ends pending the outcome of further steps associated with bubble 'A' 228 and described further below.

Referring back to block 206, if the user is a bookmaker 120 (typically associated with or as part of a casino licensed by an authorized governmental agency), and wishes to join as a book making affiliate they are queried in block 240 whether they are a current affiliate. If they are a current affiliate, the process is directed to block 248 for login to the website.

If the user is not a present affiliate, they are directed to block 242 to enter a new membership identification including a user name and password. In block 244 the new affiliate is prompted for and enters demographic information such as the business name, available or offered services, address, contact information, etc. Once the affiliate has been approved they are then directed to block 248 to login with their user name and password. The bookmaker is then prompted in block 246 to establish a financial account with the betting exchange for the purpose of depositing money in the account for accepting offered wagers. All wagers accepted by the bookmaker 140, 142, 144 must be covered by funds currently on deposit with the betting exchange. The new bookmaker's preferred method of transferring monetary funds can also be established and entered as part of the account establishment process of block 246. After establishing the bookmaker's new membership, they are requested to login to their account in block 248 by entering their user name and password established in block 242.

Once logged in to their account, the bookmaker, in block 250, is queried whether they wish to make a deposit of monetary funds into their financial account. The betting exchange requires that as a prerequisite to accepting an offered wager, the bookmaker accepting an offered wager have monetary funds on deposit with the betting exchange at least in the amount of the offered wager. No credit or credit extensions are permitted. If the bookmaker does not wish to make a deposit, the process proceeds to block 254. However if the bookmaker 140, 142 144 wishes to make a deposit in their financial account, the process is directed to block 252 and the money is transferred from the bookmaker 140, 142, 144 to the betting exchange 110 for credit in the bookmaker's financial account. The process then proceeds to block 254 where the bookmaker 140, 142, 144 can enter into the system via their network terminal 141, 143, 145 to review prospective wagers entered by users 130 (viewable through completion of bubble 'B' 256 and described below) and offered for acceptance by a bookmaker. Once bookmaker 140, 142, 144 has reviewed a posted wager offer, they may select the offered wager for acceptance in block 258. Only bookmakers 140, 142, 144 may accept an offered wager, and they may accept wagers on either team playing in the sporting event; however, they are permitted to only take an offer with odds that match their current numbers posted in their business at the time they are accepting the offered wager.

Upon selecting an offered wager for acceptance in block 258, the betting exchange debits the financial account of the bookmaker for the amount(s) of the accepted wagers in block 260 to be held by betting exchange 110 until the outcome of the sporting event is determined. Once the bookmaker's account has been debited in block 260, further processing of the accepted wager is indicated by bubble 'C' 262. The bookmaker is then queried whether they wish to review additional wager offers for acceptance. If they so desire, the process returns to block 254 and continues until the bookmaker desires to accept no further wager offers and the process then ends in block 232 pending the outcome of the further steps associated with bubble 'C' 262 as described further below.

Figure 2B:
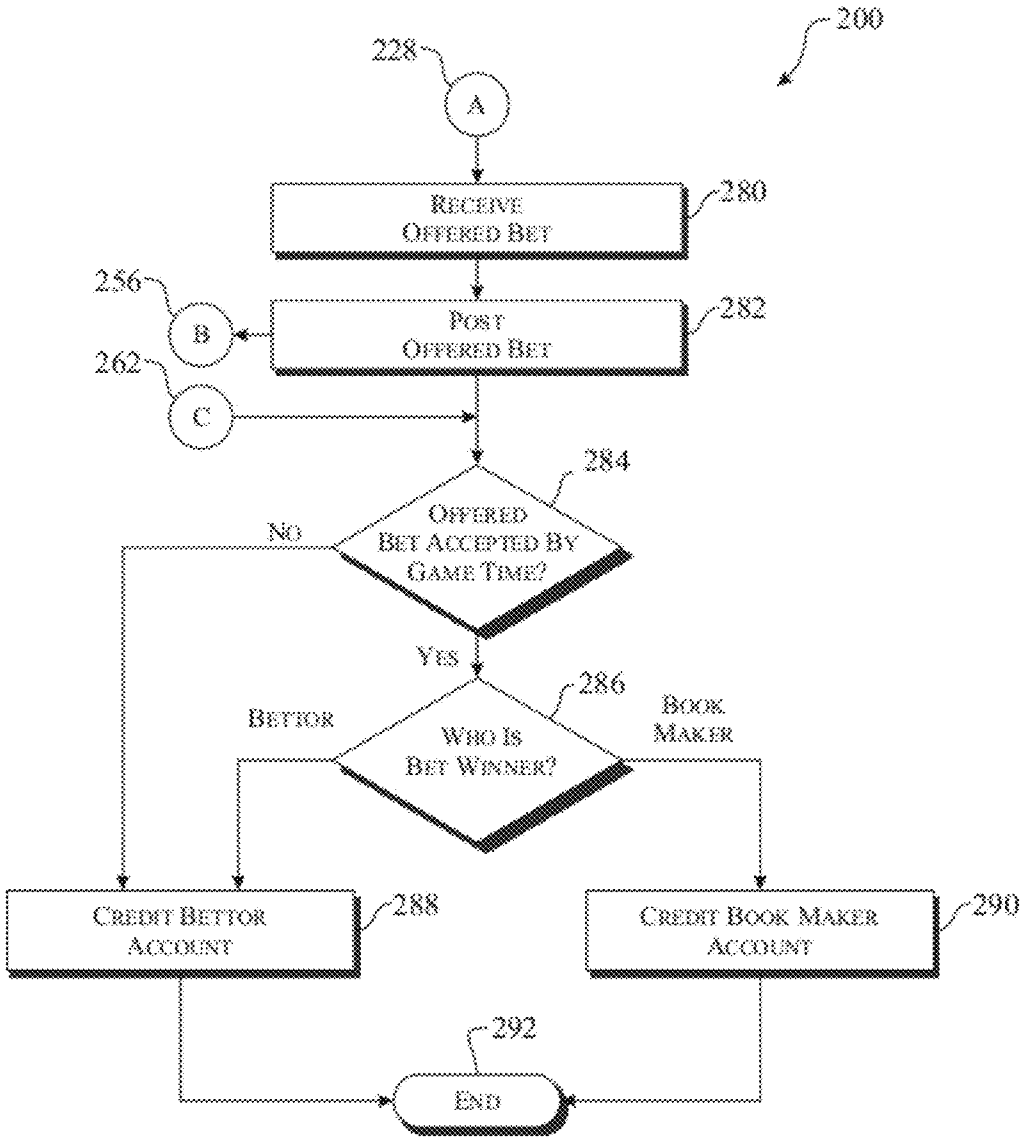

Referring now to FIG. 2B, wager matching process 200 continues. After user 130 has marked their wager offer for posting in block 226, the betting exchange 110 receives the offered wager in block 280 (via bubble 'A' 228). Computer 112 executing the instruction set then posts the offered wager for viewing in block 282 (viewable by bookmakers 140, 142, 144 via bubble 'B'). Once a bookmaker 140, 142, 144 has accepted an offered wager in block 258 and their account has been debited in block 260, the process proceeds (via bubble 'C' 262) to block 284. In block 284, computer 112 running the executable instruction set determines whether the offered wager has been accepted prior to the commencement of the sporting event. If the offered wager has not been accepted prior to commencement of the sporting event, the process goes to block 288 where the debited monetary funds of the user's wager offered in block 222 is reaccredited to the user's financial account and the process then ends at block 292.

However, if the wager offered by user 130 has been timely accepted in block 258 by a bookmaker 140, 142, 144, the process progresses to block 286 where the betting exchange 110 determines whether the bettor or the bookmaker has won the wager. If the bettor has won the wager, the wager's winnings are credited to bettor's financial account in block 288 and the process ends at block 292. If, however, the bookmaker has won the wager, the bookmaker's winnings are credited to the bookmaker's financial account in block 290 and the process ends at block 292.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A network based sporting event wagering system comprising:

a wagering exchange company having a central office having a central computer, memory storage unit, and an instruction set stored on said memory storage unit and executable by said central computer;

at least one bookmaker associated with said wagering exchange company;

a first network terminal accessible by said at least one licensed bookmaker;

a second network terminal accessible by a prospective bettor for posting a desired wager on a sporting event with odds preferred by said prospective bettor;

an electronic network connecting said first network terminal and said second network terminal with said central computer at a betting exchange company; wherein:

said executed instruction set operates on said central computer to receive said desired wager from said prospective bettor and cause said desired wager to be displayed to said at least one bookmaker such that said at least one bookmaker has the option of accepting said desired sporting event wager at said odds preferred by said prospective bettor.

2. A sporting event wagering system according to claim 1 wherein said electronic network is the Internet.

3. A sporting event wagering system according to claim 1 wherein said second network terminal is located in a private home.

4. A sporting event wagering system according to claim 1 wherein said second network terminal is a portable electronic device having a connection to the Internet.

5. A sporting event wagering system according to claim 4 wherein said portable electronic device includes a wireless connection to the Internet.

6. A sporting event wagering system according to claim 1 wherein said prospective bettor is required to prove personal residence in a governmentally controlled geographical area permitting licensed wagering.

7. A sporting event wagering system according to claim 6 wherein said at least one bookmaker is required to be licensed by a governmental agency of said governmentally controlled geographical area permitting licensed wagering.

8. A sporting event wagering system according to claim 1 wherein said prospective bettor is required to establish a financial account with said wagering exchange company.

9. A sporting event wagering system according to claim 8 wherein said prospective bettor is permitted to wager a monetary amount not in excess of a balance in said prospective bettor's said financial account.

10. A sporting event wagering system according to claim 1 wherein said bookmaker is required to establish a financial account with said wagering exchange company.

11. A sporting event wagering system according to claim 10 wherein said bookmaker is permitted to accept a wager for a monetary amount not in excess of a balance in said bookmaker's said financial account.

12. A method of matching a bookmaker with a prospective bettor who is offering a wager on a sporting event at specified or preferred odds, said method comprising the steps:

hosting an executable instruction set on a system, said system comprising a central computer, wherein the central computer is accessible by a first network and a second network terminal interconnected thereto by an electronic network, wherein a bookmaker accesses the central computer via the first network terminal and a prospective bettor accesses the central computer via the second network terminal;

receiving from a prospective bettor an offer to wager on a sporting event a specified amount of money at odds preferred by the prospective bettor;

deducting a monetary amount of the offered wager from a financial account of the prospective bettor;

posting for display to bookmakers wager offers received on the sporting event including the bettors preferred odds;

recording a wager accepted by a bookmaker at the odds preferred by the prospective bettor;

deducting a monetary amount of the accepted wager from a financial account of the bookmaker;

determining whether the bettor or the bookmaker is the winner of the wager; and effecting payment of the wager to the winning party of the accepted wager.

13. The method according to claim 12 further including after the receiving step, the step of verifying that the prospective bettor is a resident of a territory permitting legalized wagering.

14. The method according to claim 12 further including prior to the receiving step, the steps of:

establishing a financial account in the name of a prospective bettor; and accepting from the prospective bettor a monetary sum for deposit in the prospective bettor's financial account.

15. The method according to claim 12 further including prior to the receiving step, the steps of:

establishing a financial account in the name of a bookmaker; and accepting from the bookmaker a monetary sum for deposit in the bookmaker's financial account.

16. The method according to claim 12 further including after the posting step, the steps of:

comparing the current time with the scheduled start time of the sporting event;

determining which wagers offered by prospective bettors have not been accepted by a bookmaker; and re-depositing in the financial account of a prospective bettor the monetary amount of the offered wager.

17. The method according to claim 12 wherein said step of receiving an offered wager from a prospective bettor is received over the Internet.

18. The method according to claim 12 wherein said step of receiving an offer for a wager from a prospective bettor is accomplished with a private network terminal connected to the Internet.

19. The method according to claim 12 wherein said step of receiving an offer for a wager from a prospective bettor is accomplished with a portable electronic device having a connection to the Internet.

20. The method according to claim 19 wherein the portable electronic device includes a wireless connection to the Internet.

* * * * *